US00RE48644E

(19) United States
(12) Reissued Patent
Ding

(10) Patent Number: US RE48,644 E
(45) Date of Reissued Patent: Jul. 13, 2021

(54) CRYPTOGRAPHIC SYSTEM USING PAIRING WITH ERRORS

(71) Applicant: Jintai Ding, Cincinnati, OH (US)

(72) Inventor: Jintai Ding, Cincinnati, OH (US)

(21) Appl. No.: 16/678,383

(22) Filed: Nov. 21, 2019

Related U.S. Patent Documents

Reissue of:
(64) Patent No.: 9,246,675
Issued: Jan. 26, 2016
Appl. No.: 14/491,992
PCT Filed: Apr. 11, 2013
PCT No.: PCT/CN2013/074053
§ 371 (c)(1),
(2) Date: Sep. 22, 2014
PCT Pub. No.: WO2013/152725
PCT Pub. Date: Oct. 17, 2013

U.S. Applications:
(62) Division of application No. 15/881,531, filed on Jan. 26, 2018, now Pat. No. Re. 47,841, which is an application for the reissue of Pat. No. 9,246,675.

(60) Provisional application No. 61/623,272, filed on Apr. 12, 2012.

(51) Int. Cl.
*H04L 9/08* (2006.01)
*H04L 9/14* (2006.01)
*H04L 9/30* (2006.01)

(52) U.S. Cl.
CPC ..... *H04L 9/0819* (2013.01); *H04L 9/083* (2013.01); *H04L 9/0847* (2013.01); *H04L 9/14* (2013.01); *H04L 9/3073* (2013.01); *H04L 9/3093* (2013.01); *H04L 2209/24* (2013.01); *H04L 2209/34* (2013.01)

(58) Field of Classification Search
CPC ..... H04L 9/08; H04L 9/14; H04L 9/30; H04L 9/0819; H04L 9/083; H04L 9/0847; H04L 9/3093; H04L 9/3073; H04L 2209/24; H04L 2209/34
See application file for complete search history.

(56) References Cited

U.S. PATENT DOCUMENTS 6,263,437 B1 * 7/2001 Liao ..... H04L 9/0841 380/283
7,603,554 B2 * 10/2009 Futa ..... H04L 9/3236 380/274
8,107,397 B1 * 1/2012 Bagchi ..... H04L 9/0822 370/254
8,297,510 B1 * 10/2012 Yakshtes ..... H04L 9/3247 235/462.1
2003/0081774 A1 5/2003 Lin et al.
2006/0034457 A1 * 2/2006 Damgaard ..... H04L 9/0861 380/44
2007/0271606 A1 * 11/2007 Amann ..... H04W 12/02 726/15
2008/0044028 A1 2/2008 Sun et al.
2008/0046732 A1 2/2008 Fu et al.
2008/0069344 A1 * 3/2008 Yao ..... H04L 9/3026 380/44
2008/0112596 A1 * 5/2008 Rhoads ..... G06K 9/00577 382/115
2009/0154711 A1 6/2009 Jho et al.
2009/0204823 A1 * 8/2009 Giordano ..... G06F 11/3648 713/190
2009/0208019 A1 * 8/2009 Celik ..... H04L 9/085 380/277
2009/0327141 A1 * 12/2009 Rabin ..... G06Q 20/401 705/75
2010/0077462 A1 * 3/2010 Joffe ..... H04L 63/126 726/5
2012/0166809 A1 * 6/2012 Barton ..... H04L 9/0844 713/181
2012/0236968 A1 * 9/2012 Zhou ..... H04L 25/0244 375/316

OTHER PUBLICATIONS

Damgard et al., A Quantum Cipher with Near Optimal Key-Recycling, Dept. of Computer Science, University of Arhus, Sep. 13, 2005.*
International Patent Application No. PCT/CN2013/074053; Int'l Written Opinion and Search Report; dated Jul. 18, 2013; 9 pages.
Vadim Lyubashevsky et al"On Ideal Lattices and Learning with Errors Over Rings", Journal of the ACM, vol. 60, No. 6, Article 43, Publication date: Nov. 2013; 36 pages.
Du et al., "A Pairwise Key Management Scheme Based on Hash Function for Wireless Sensor Networks", 2010 Second International Workshop on Education Technology and Computer Science.

* cited by examiner

*Primary Examiner* — Minh Dieu Nguyen
(74) *Attorney, Agent, or Firm* — BakerHostetler

(57) ABSTRACT

Using the same mathematical principle of paring with errors, which can be viewed as an extension of the idea of the LWE problem, this invention gives constructions of a new key exchanges system, a new key distribution system and a new identity-based encryption system. These new systems are efficient and have very strong security property including provable security and resistance to quantum computer attacks.

34 Claims, No Drawings

CRYPTOGRAPHIC SYSTEM USING PAIRING WITH ERRORS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*More than one reissue application has been filed for the reissue of U.S. Pat. No. 9,246,675. The reissue applications are U.S. application Ser. No. 16/678,383 (the present application and a divisional reissue), Ser. No. 16/678,335 (a divisional reissue), and Ser. No. 15/881,531 (granted as U.S. Pat. No. RE 47,841E1), all of which are reissue applications of U.S. Pat. No. 9,246,675.*

*U.S. Pat. No. 9,246,675, which issued on Jan. 26, 2016, is the National Stage of International Application No. PCT/CN2013/074053 filed on Apr. 11, 2013, which claims benefit under 35 U.S.C. § 119(e) of Provisional U.S. Patent Application No. 61/623,272, filed on Apr. 12, 2012, the disclosures of which are hereby incorporated by reference in their entireties.*

The present disclosure claims priority to the U.S. provisional patent application with Ser. No. 61/623,272, entitled "New methods for secure communications and secure information systems", filed Apr. 12, 2012 and PCT application with the same title and the PCT number PCT/CN2013/074053 filed on Apr. 11, 2013, which is incorporated herein by reference in its entirety and for all purposes.

BACKGROUND

This invention is related to the construction of cryptographic systems, in particular, key exchange (KE) systems, key distribution (KD) systems and identity-based-encryption (IBE) systems, which are based on essentially the same mathematical principle, pairing with errors.

In our modern communication systems like Internet, cell phone, and etc, to protect the secrecy of the information concerned, we need to encrypt the message. There are two different ways to do this. In the first case, we use symmetric cryptosystems to perform this task, where the sender uses the same key to encrypt the message as the key that the receiver uses to decrypt the message. Symmetric systems demand that the sender and the receiver have a way to exchange such a shared key securely. In an open communication channel without any central authority, like wireless communication, this demands a way to perform such a key exchange (KE) in the open between two parties. In a system with a central server, like a cell phone system within one cell company, this demands an efficient and scalable key distribution (KD) system such that any two users can derive a shared key via the key distribution (KD) system established by the central server. Therefore it is important and desirable that we have secure and efficient KE systems and KD systems. The first KE system was proposed by Diffie and Hellman [DiHe], whose security is based on the hardness of discrete logarithm problems. This system can be broken by future quantum computers as showed in the work of Shor [SHO]. There are many key-distribution systems including the system using pairing over quadratic forms [BSHKVY], and the one based on bilinear paring over elliptic curves by Boneh and Boyen (in U.S. Pat. No. 7,590,236). But the existing systems have either the problem of computation efficiency or scalability. For instance, the bilinear paring over elliptic curves is very computationally intensive.

In the second case, we use asymmetric systems, namely public key cryptographic systems, for encryption, where the receiver has a set of a public key and a private key, and the sender has only the public key. The sender uses the public key to encrypt messages, the receiver uses the private key to decrypt the messages and only the entity who has the private key can decrypt the messages. In an usual public key system, we need to make sure the authenticity of the public keys and therefore each public key needs to have a certificate, which is a digital signature provided by a trusted central authority. The certificate is used to verify that the public key belongs to the legitimate user, the receiver of a message. To make public key encryption system fully work, we need to use such a system, which is called a public key infrastructure (PKI) system.

In 1984, Shamir proposed another kind of public key encryption system [SHA]. In this new system, a person or an entity's public key is generated with a public algorithm from the information that can identify the person or the entity uniquely. For example, in the case of a person, the information may include the person's name, residential address, birthday, finger print information, e-mail address, social security number and etc. Since the public key is determined by the public information that can identify the person, this type of public key cryptosystem is called an identity-based encryption (IBE) system.

There are a few Identity-based-encryption (IBE) public key cryptosystems, and currently, the (best) one being practically used is the IBE system based on bilinear paring over elliptic curves invented by Boneh and Franklin (in U.S. Pat. No. 7,113,594). In IBE systems, a sender encrypts a message for a given receiver using the receiver's public key based on the identity of the receiver. The receiver decrypts the message using the receiver's private key. The receiver obtains the private key from a central server, which has a system to generate and distribute the IBE private key for the legitimate user securely. An IBE system does not demand the sender to search for the receiver's public key, but rather, a sender in an IBE system derives any receiver's corresponding public key using an algorithm on the information that identifies the receiver, for example, an email address, an ID number or other information. Current IBE systems are very complicated and not efficient in terms of computations, since the bilinear paring over elliptic curves is very computationally intensive. These systems based on pairing over elliptic curves can also be broken efficiently if we have a quantum computer as showed in the work of Shor [SHO]. There are also constructions based on lattices, but those are also rather complicated systems for applications [ABB] [ABVVW] [BKPW]. Therefore it is important and desirable that we have secure and efficient IBE systems.

Clearly, there are still needs for more efficient and secure KE, KD and IBE systems for practical applications.

BRIEF SUMMARY OF THE INVENTION

This invention first contains a novel method for two parties A and B to perform an secure KE over an open communication channel. This method is based on the computation of pairing of the same bilinear form in two different ways but each with different small errors. In the KE process, each users will choose a private matrix $S_A$, $S_B$ respectively with small entries following certain error distributions secretly and a public matrix M randomly. Then each user will compute the multiplication of the user's secret matrix with the publicly chosen matrix but with small errors, exchange the new matrices, and then perform the computation of pairing of $S_A$ and $S_B$ over the same bilinear form based on M in two different ways but each with different small errors. This kind of mathematical computation is called pairing with errors. The shared key is derived from the pairings with a rounding technique. This method can be viewed as an extension of the idea of the learning with errors (LWE) problem discovered by Regev in 2005 [Reg]. The security of this system depends the hardness of certain lattice problem, which can be mathematically proven hard [DiLi]. This system involves only matrix multiplication and therefore is very efficient. Such a system can also resist the future quantum computer attacks.

This invention second contains a novel method to build a KD system with a central server or authority. In this system, the central server or authority assigns each user i a public ID as a matrix $A_i$ with small entries or establish the ID of each user as a matrix $A_i$ with small entries following certain error distributions with the information that can identify the user uniquely, and, in a secure way, gives each user a private key based on certain multiplication of this ID matrix with the central server or authority's secret master key M, another matrix, but with small errors. Then any two users in the system will compute the pairing of the two ID matrices of the users with the same bilinear form based on the master key matrix M in two different ways but each with different small errors to derive a shared key between these two users with certain rounding technique. This method can be viewed as an extension of the idea of the learning with error problem discovered by Regev in 2005 [Reg]. The security of this system depends on the hardness of the problem related to pairing with errors. This system involves only matrix multiplication and therefore is very efficient.

This invention third contains a novel method to build a IBE system with a central server or authority. In this system, the central server or authority assigns each user i a public ID $A_i$ as a matrix with small entries following certain certain error distributions or establish the ID of each user as a matrix with small entries following certain certain error distributions with the information that can identify the user uniquely. Each user is given by the central server or authority a private key $S_i$ based on certain multiplication of this ID matrix with the central server or authority's master private key S, another matrix, but with errors related to one part of the master public key M, another matrix. The central server or authority will establish another half of the mater key as the multiplication of M and S with small errors, which we call $M_1$. Then any user who wishes to send the user i a message in the system will compute public key of i which consists of M and a paring of M and $A_i$ of the bilinear form based on the master secret key matrix S, then encrypt the message using the encryption system based on the MLWE problem, and the user i will use the secret key $S_i$ to decrypt the message. This method can be viewed as an extension of the idea of the learning with error problem discovered by REGEV in 2005. The security of this system depends the harness of certain lattice problem, which can be mathematically proven hard. This system involves only matrix multiplication and therefore is very efficient.

In our constructions, we can replace matrices by elements in ideal lattice, and we can also use other type of rounding techniques. We can also build the system in a distributed way where several servers can work together to build KD and IBE systems.

In short, we use the same mathematical principle of paring with errors, which can be viewed as an extension of the idea of the LWE problem, to build secure and more efficient KE, KD and IBE systems.

Though this invention has been described with specific embodiments thereof, it is clear that many variations, alternatives, modifications will become apparent to those who are skilled in the art of cryptography. Therefore, the preferred embodiments of the invention as set forth herein, are intended to be illustrative, not limiting. Various changes may be made without departing from the scope and spirit of the invention as set forth herein and defined in the claims. The claims in this invention are based on the U.S. provisional patent application with Ser. No. 61/623,272, entitled "New methods for secure communications and secure information systems", filed Apr. 12, 2012, only more technical details are added.

DETAILED DESCRIPTION OF THE INVENTION

1.1 The Basic Idea of Pairing with Errors

The learning with errors (LWE) problem, introduced by Regev in 2005 [Reg], and its extension, the ring learning with errors (RLWE) problem [LPR] have broad application in cryptographic constructions with some good provable secure properties. The main claim is that they are as hard as certain worst-case lattice problems and hence the related cryptographic constructions.

A LWE problem can be described as follows. First, we have a parameter n, a (prime) modulus q, and an error probability distribution n on the finite ring (field) $F_q$ with q elements. To simplify the exposition, we will take q to be a odd prime and but we can also work on any whole number except that we may need to make slight modifications.

In $F_q$, each element is represented by the set $\{-(q-1)/2, \ldots, 0, \ldots, (q-1)/2\}$. In this exposition, by "an error" distribution, we mean a distribution we mean a distribution such that there is a high probability we will select an element, which is small. There are many such selections and the selection directly affect the security of the system. One should select good error distribution to make sure the system works well and securely.

Let $\Pi_{S,\kappa}$, on $F_q$ be the probability distribution obtained by selecting an element A in $F_q^n$ randomly and uniformly, choosing $e \in F_q$ according to $\kappa$, and outputting $(A, \langle A, S\rangle + e)$, where + is the addition that is performed in $F_q$. An algorithm that solves the LWE problem with modulus q and error distribution $\kappa$, if, for any S in $F_q^n$, with an arbitrary number of independent samples from $\Pi_{S,\kappa}$, it outputs S (with high probability).

To achieve the provable security of the related cryptographic constructions based on the LWE problem, one chooses q to be specific polynomial functions of n, that is q is replaced by a polynomial functions of n, which we will denote as q(n), $\kappa$ to be certain discrete version of normal distribution centered around 0 with the standard deviation $\sigma=\alpha q \geq \sqrt{n}$, and elements of $F_q$ are represented by integers in the range $[-(q\ 1)/2, (q\ 1)/2)]$, which we denote as $\kappa_\sigma$.

In the original encryption system based on the LWE problem, one can only encrypt one bit a time, therefore the system is rather inefficient and it has a large key size. To further improve the efficiency of the cryptosystems based on the LWE problem, a new problem, which is a LWE problem based on a quotient ring of the polynomial ring $F_q[x]$ [LPR], was proposed. This is called the ring LWE (RLWE) problem. In the cryptosystems based on the RLWE problem, their security is reduced to hard problems on a subclass of lattices, the class of ideal lattices, instead of general lattices.

Later, a new variant of LWE was proposed in [ACPS]. This variant of the LWE problem is based on the LWE problem. We will replace a vector A with a matrix A of size m×n, and S also with a matrix of size n×1, such that they are compatible to perform matrix multiplication A×S. We also replace e with a compatible matrix of size m×1. We will work on the same finite field with q elements.

To simplify the exposition, we will only present, in detail, for the case where A is a square matrices of the size n×n and, S and e of the size n×1.

Let $\Pi_{S,\kappa_n}$, over $F_q$ be the probability distribution obtained by selecting an n×n matrix A, whose each entry are chosen in $F_q$ uniformly and independently, choosing e as a n×1 vector over $F_q$ with entries chosen according to certain error distribution $\kappa_n$, for example, each entries follows an error distribution n independently, and outputting (A, A×S+e), where + is the addition that is performed in $F_q^n$. An algorithm that solves a LWE with modulus q and error distribution $\kappa_n$, if, for any vector S in $F_q^n$, with any number of independent sample(s) from $\Pi_{S,\kappa_n}$, it outputs S (with high probability).

For the case that we choose a small S, namely entries of S are chosen independently according to also the error distribution $\kappa_n$, we call this problem a small LWE problem (SLWE). If we further impose the condition A to be symmetric, we call it a small symmetric LWE problem (SSLWE). If we choose the secret S randomly and independently from the set −z, . . . , 0, 1 . . . , z with z a fixed small positive integer, we call such a problem uniformly small LWE problem (USLWE).

For practical applications, we can choose S and e with different kind of error distributions.

Due to the results in [ACPS], we know If the secret S's coordinates and the error e's entries are sampled independently from the LWE error distribution $\kappa_\sigma$, the corresponding LWE problem is as hard as LWE with a uniformly random secret S. This shows that the SLWE problem is as hard as the corresponding LWE problem. The same is true for the case of the RLWE problem that if one can solve the Ring LWE problem with a small secret namely the element S being small, then one can solve it with an uniform secret.

We further extend the problem to a full matrix form.

Let $\Pi_{S,\kappa_n^2}$ over $F_q$ be the probability distribution obtained by selecting an n×n matrix A, whose each entry are chosen in $F_q$ uniformly and independently, choosing e as a n×n matrix over $F_q$ with entries following certain error distribution $\kappa_{n^2}$, for example, an distribution chosen according to the error distribution n independently, and outputting (A, A×S+e), where + is the addition that is performed in $F_q^{n^2}$. An algorithm that solves a LWE with modulus q and error distribution $\kappa_{n^2}$, if, for any n×n matrix S in $F_q^n$, with any number of independent sample(s) from $\Pi_{S,\kappa_n^2}$, it outputs S (with a high probability).

We call this problem matrix LWE problem (MLWE). For the case where we choose a small S, namely entries of S also follows the error distribution $\kappa_{n^2}$, we call this problem a small MLWE problem (SMLWE). If we further impose the condition A to be symmetric, we call it a small symmetric MLWE problem (SSMLWE). If we choose the secret S randomly and independently from the set −z, . . . , 0, 1 . . . , z with z a fixed small positive integer, we call such a problem uniformly small MLWE problem (USMLWE). It is clear the MLWE problem is nothing but put n LWE problem together and sharing the same matrices. Therefore it is as hard as the corresponding LWE problem.

We can use different error distributions for S and e.

The mathematical principle behind our construction comes from the fact of associativity of matrices multiplications of three matrices A, B and C:

$$A\times B\times C=(A\times B)\times C=A\times(B\times C).$$

Such a product can be mathematically viewed as computing the bilinear paring of the row vectors of A with column vectors of C.

For two matrices A and B with small entries following certain error distributions, for example, with entries following some error distributions, instead of computing this product directly, we can first compute $$AB+E_a,$$

then compute $$(AB+E_A)C \text{ or } (AB+E_A)C+E_{AC},$$

or we will compute $$BC+E_C,$$

then compute $$A(BC+E_c) \text{ or } (AB+E_A)C+E_{BC},$$

where $E_A$, $E_B$, $E_{AC}$, $E_{BC}$ are matrices with small entries following the same (or different) error distributions. Then we have two way to compute the product ABC with small errors or differences between these two matrices. We call such a computation pairing with errors. All our constructions depends on such a paring with errors and on the fact that the two different paring are close to each other if A and C are also small.

We can mathematically prove the theorem that an MLWE problem is as hard as the corresponding LWE problem with the same parameters. This provides the foundation of the provable security of our constructions 1.2 The Construction of the New KE Systems Based on Paring with Errors Two parties Alice and Bob decide to do a key exchange (KE) over an open channel. This means that the communication of Alice and Bob are open to anyone including malicious attackers. To simplify the exposition, we will assume in this part all matrices involves are n×n matrices. But they do not have to be like this, and they can be matrices of any sizes except that we need to choose the compatible sizes such that the matrix multiplications performed are well defined.

Their key change protocol will go step by step as follows.

(1) Alice and Bob will first publicly select $F_q$, n and a n×n matrix M over $F_q$ uniformly and randomly, where q is of size of a polynomial of n, for example $q\approx n^3$, and an error distribution $\kappa_{n^2}$ to be a distribution over n×n matrices over $F_q$, for example, a distribution that each component are independent and each component follow certain error distribution like the discrete error distribution $\kappa_\sigma$ as in the case of LWE, namely a discrete normal distribution over $F_q$ center around 0 with standard deviation approximately $\sqrt{n}$. All the information above is public. They jointly and publicly choose a small (prime) integer t (t<<n).

(2) Then each party chooses its own secret $S_i$ (i=A, B) as a n×n matrix chosen according to the error distribution $\kappa_{n^2}$, $e_i$ also as a n×n matrix following the error distribution. For Alice, she computes $$M_A=MS_A+te_A,$$

where t is a small integer (t<<n).

For Bob, he computes $$M_B=M^tS_B+te_B.$$

(3) Both parties exchange $M_i$ in the open communication channel. This means both $M_i$ (i=A, B) are public, but keep $S_i$ and $e_i$ (i=A, B), secret.

(4) Alice computes:

$$K_A=S^t_A\times M_B=S^t_AM^tS_B+tS^t_Ae_B.$$

Bob computes:

$$K_B=M^t_A\times S_B=S^t_AM^tS_B+te^t_AS_B.$$

(5) Both of them will perform a rounding technique to derive the shared key as follows:

(a) Bob will make a list $T_1$ of all positions of the entries of $K_B$ such that these entries are in the range of [−(q−1)/4, (q−1)/4] and a list $T_2$ of all positions which are not in the range of [−(q−1)/4, (q−1)/4]. Then Bob will send to Alice the list $T_1$.

(b) Then each party will compute the residues of these entries modular t in $T_1$, and for the entries not in $T_1$, which is in $T_2$, they will add (q−1)/2 to each entry and compute the residue modular q first (into the range of [−(q−1)/4, (q−1)/4]) then the residue modular t. That gives a shared key between these two users.

The reason that Alice and Bob can derive from $K_A$ and $K_B$ a shared secret to be the exchanged key via certain rounding techniques as in the case above is exactly that $e_i$ and $S_i$ are small, therefore $K_A$ and $K_B$ are close. We call this system a SMLWE key exchange protocol. We can derive the provable security of this more efficient system [Dili].

In term of both communication and computation efficiency, the new system is very good. The two parties need to exchange $n^2$ entries in $F_q$, and each perform $2n^{2.8}$ computations (with Strassen fast matrix multiplication [STR]) to derive $n^2$ bits if t=2.

$S_i$ and $e_i$ can follow different kind of error distributions.

We can prove the theorem that if we choose the same system parameters, namely n and q, the matrix SLWE key exchange protocol is provably secure if the error distribution is properly chosen [DiLi]. The proof relies on the mathematical hardness of the following pairing with error problem.

Assume that we are given (1) an n×n matrix M, a prime integer q, a small positive integer t, and an error distribution $\kappa_n$ and;

$$M'_A=MS'_A+te_A$$

and $$M'_B=M^tS'_B+te_B, \quad (2)$$

where $e_i$, a n×1 vector follows the error distribution $\kappa_n$ and the entries of n×1 vectors also follows the same error distribution;

(3) and the fact that $$K'_B=M^t_A\times S'_B=(S'_A)^tM^tS'_B+t<e_A,S'_B>$$

is in the range of [−(q−1)/4, (q−1)/4] or not;

the problem is to find an algorithm to derive $$K'_A=(S'_A)^t\times M_B=(S'_A)^tM^tS'_B+t<S'_A,e_B>$$

modular t if $K'_B$ is in the range of [−(q−1)/4, (q−1)/4], otherwise $K'_A$+(q−1)/2 first modular q then modular t, with a high probability. We call such a problem a pairing with error problem (PEP).

The proof follows from the fact that the SMLWE problem is as hard as the SLWE problem, since the matrix version can be viewed as just assembling multiple SLWE samples into one matrix SLWE sample.

We note here that we can choose also rectangular matrix for the construction as long as we make sure the sizes are matching in terms of matrix multiplications, but parameters need to be chosen properly to ensure the security.

Similarly we can build a key exchange system based on the ring learning with errors problem (RLWE) [LPR], we will a variant of the RLWE problem described in [LNV].

For the RLWE problem, we consider the rings R=Z[x]/f(x), and $R_q$=R/qR, where f(x) is a degree n polynomial in Z[x], Z is the ring of integers, and q is a prime integer. Here q is an odd (prime) and elements in $Z_q=F_q$=Z/q are represented by elements: −(q−1)/2, . . . , −1, 0, 1, . . . , (q−1)/2, which can be viewed as elements in 2 when we talk about norm of an element. Any element in $R_q$, is represented by a degree n polynomial, which can also be viewed as a vector with its corresponding coefficients as its entries. For an element $$a(x)=a_0+a_1x+\ldots+a_{n-1}x^{n-1},$$

we define $$\|a\|=\max|a_i|,$$

the $l_\infty$ norm of the vector $(a_0, a_1, \ldots, a_{n-1})$ and we treat this vector as an element in $Z^n$ and $a_i$ an element in Z. We can also choose q to be even positive number and things need slight modification.

The $RLWE_{f,q,\chi}$ problem is parameterized by an polynomial f(x) of degree n, a prime number q and an error distribution X over $R_q$. It is defined as follows.

Let the secret s be an element in $R_q$, a uniformly chosen random ring element. The problem is to find s, given any polynomial number of samples of the pair $$(a_i,b_i=a_i\times s+e_i),$$

where $a_i$ is uniformly random in $R_q$ and $e_i$ is selected following certain error distribution X.

The hardness of such a problem is based on the fact that the $b_i$ are computationally indistinguishable from uniform in $R_q$. One can show [LPR] that solving the $RLWE_{f,q,\chi}$ problem above is known to give us a quantum algorithm that solves short vector problems on ideal lattices with related parameters. We believe that the latter problem is exponentially hard.

We will here again use the facts in [ACPS], [LPR] that the $RLWE_{f,q,\chi}$ problem is equivalent to a variant where the secret s is sampled from the error distribution X rather than being uniform in $R_q$ and the error element $e_i$ are multiples of some small integer t.

To derive the provable security, we need consider the RLWE problem with specific choices of the parameters.

We choose f(x) to be the cyclotomic polynomial $x^n+1$ for $n=2^u$, a power of two;

The error distribution $\chi$ is the discrete Gaussian distribution $D_{Z^n,\sigma}$ for some $n>>\sigma>\omega(\sqrt{\log n})>1$;

q=1 (mod 2n) and q a polynomial of n and $q\approx n^3$;

t a small prime and t<<n<<q.

We can also use other parameters for practical applications.

There are two key facts in the $RLWE_{f,q,\chi}$ setting defined above, which are needed for our key exchange system.

(1) The length of a vector drawn from a discrete Gaussian of with standard deviation a is bounded by σn, namely, $$\Pr(\|X\|>\sigma n)\leq 2^{-n+1},$$

for X chosen according to X.

(2) The multiplication in the ring $R_q$ increases from the norms of the constituent elements in a reasonable scale, that is, $$\|X\times Y(\bmod f(x))\|\leq n\|X\|\|Y\|,$$

for $X, Y \in R_q$ and the norm is the $l_\infty$ norm defined above.

With the $RLWE_{f,q,\chi}$ setting above, we are now ready to have two parties Alice and Bob to do a key exchange over an open channel. It goes step by step as follows.

(1) Alice and Bob will first publicly select all the parameters for the $RLWE_{f,q,\chi}$ including $q(\approx n^3$ or similar polynomial functions of n), n, f(x) and χ. In addition, they will select a random element M over $R_q$ uniformly. All the information above is public.

(2) Then each party chooses its own secret $s_i$ as an element in $R_q$ according to the error distribution χ, and $e_i$ independently also as an element following the error distribution χ, but jointly choose a small prime integer t (t<<n) For Alice, she computes $$M_A=Ms_A+te_A,$$

where t is a small integer (t<<n).

For Bob, he computes $$M_B=Ms_B+te_B.$$

(3) Both parties exchange $M_i$. This means both $M_i$ are public, but certainly keep $s_i$ and $e_i$ secret.

(4) Alice computes:

$$K_A=s_A\times M_B=s_AMs_B+te_Bs_A.$$

Bob computes:

$$K_B=M_A\times s_B=s_AMs_B+te_As_B.$$

(5) Both of them will perform a rounding technique to derive the shared key as follows:

(a) Bob will then make a list of size n, and this list consists of pairs in the form of (i, j), where i=0, . . . , n−1, and j=1 if the $x^i$ coefficient of $K_B$ is in the range of [−(q−1)/4, (q−1)/4], otherwise j=0.

(b) Then Bob will send this list to Alice. Then each will compute the residue of the corresponding entries modular t in the following way:

for an element of the list (i, j), 1) if j=1, each will compute the i-th entry of $K_A$ and $K_B$ modular t respectively;

2) if j=0, each will add (q−1)/2 to the i-th entry of $K_A$ and $K_B$ modular q back to range of [−(q−1)/4, (q−1)/4], then compute the residues modular t.

We can use different distributions for $s_i$ and $e_i$.

That will give a shared key between these two users. We call this system a RLWE key exchange system. We can deduce that there is a very low probability of failure of this key exchange system. We note here that the commutativity and the associativity of the ring $R_q$ play a key role in this construction.

In terms of security analysis, we can show the provable security of the system following the hardness of the $RLWE_{f,q,\chi}$ problem by using a similar PEP over the ring $R_q$ [DiLi].

Assume that we are given a random element M in $R_q$, prime integers t, q and the error distribution X with parameters selected as in the $RLWE_{f,q,\chi}$ above;

$M_A=Ms_A+te_A$ and $M_B=Ms_B+te_B$, where $e_i$ follows the error distribution X and $s_i$ also follows the error distribution χ;

and the fact that $(K_B)_i$, the coefficients $x^i$ of $K_B=M_A\times s_B=s_AMs_B+te_As_B$ is in the range of [−(q−1)/4, (q−1)/4] or not;

the problem is to find an algorithm to derive $K_B$ (or $K_A$) modular t or $K_B+(q-1)/2$ (or $K_A+(q-1)/2$) modular q (into the range of [−(q−1)/4, (q−1)/4]) and then modular t with a high probability. We call such a problem a pairing with error problem over a ring (RPE).

It is nearly a parallel extension of the proof of the provable security of the case of SLWE key exchange system to the RLWE key exchange system. We conclude that the RLWE key exchange system is provable secure based on the hardness of the $RLWE_{f,q,\chi}$ problem.

With the same parameters q and n, this system can be very efficient due to the possibility doing fast multiplication over the ring $R_q$ using FFT type of algorithms.

1.3 The Construction of the New KD Systems Based on Paring with Errors

Over a large network, key distribution among the legitimate users is a critical problem. Often, in the key distribution systems, a difficult problem is how to construct a system, which is truly efficient and scalable. For example, in the case of the constructions of [BSHKVY], the system can be essentially understood as that the master key of a central server is a symmetric matrix M of size n×n and each user's identity can be seen as a row vector $H_i$ of size n. The central server gives each user the secret $H_i\times M$. Then two users can derive the shared key as $H_i\times M\times H_j^t$. The symmetric property of M ensures that $$H_i\times M\times H_j^t=H_j^t\times M\times H_i.$$

However, large number of users can collaborate to derive the master key. If one can collect enough (essentially n) $H_i\times M$, which then can be used to find the master key M and therefore break the system.

We will build a truly scalable key distribution system using the pairing with error with a trusted central server, which can be viewed as a combination of the idea above and the idea of the LWE.

We work again over the finite field $F_q$, whose elements are represented by −(q−1)/2, . . . , 0, . . . , (q−1)/2. We choose $q\approx n^3$ or other similar polynomial function of n, we choose again $\kappa_{n^2}$ to be an error distribution over the space of n×n matrices, for example, an distribution each component are independent, and each component follows error distribution $\kappa_\sigma$, the discrete distribution as in the case of LWE, namely a discrete normal distribution over $F_q$ centered around 0 with standard deviation approximately $\sqrt{n}$. The choice of these parameters can be modified.

The key distribution system is set up step by step as follows.

(1) We have a central server, which will select a symmetric randomly chosen n×n matrix S, as a master key, whose entries are in $F_q$:

$$S=S^t.$$

(2) For each user index as i, the central server gives it a (in general not symmetric) matrix $A_t$ (as an ID) with small entries following error distribution $\kappa_{n^2}$. The ID matrix of each user is public and it can also be generated with information that can identify the user like email address, name and etc.

(3) For each user, the central server distribute securely a secret:

$$E_i=A_iS+te_i,$$

where $e_i$ is a matrix (not symmetric) selected following certain error distribution, such as $\kappa_{n^2}$. This is kept private for each user.

To obtain a secret key shared between the user i and the user j, the user i computes $$K_i=E_i\times A_j^t=A_iSA_j^t+te_iA_j^t;$$

and the user j computes $$K_j=A_i\times(E_j)^t=A_iS^tA_j^t+tA_ie_j^t=A_iSA_j^t+tA_ie_j^t.$$

This is possible because the IDs are public. They then can use the following simple rounding method to derive a shared key between the two users.

When the user j wants to establish a shared key with the user i, the user j will collect all the entries (including their positions in the matrix) in $K_j$ that are in the range of (−(q−1)/4, (q−1)/4), namely those entries which are closer to 0 than (q−1)/2. Then user j will send to the user i a list of the positions of the entries in the matrix (only the position not the values of the entries themselves) that are randomly selected from the collection, which is tagged by 0, and a list of entries not in the list tagged by 0. Then the user i will select the same entries in its own matrix $E_i\times A_j$. Now they have a shared list of common entry positions, therefore the corresponding entries of the matrix. Then each user will compute the residue of these entries modular t tagged by 1 and compute the residue of the sum of each of these entries tagged by 0 with (q−1)/2 to build a new identical ordered list of values, which will be their shared secret key.

Because S symmetric, we have that $$A_iSA_j^t=A_iS^tA_j^t,$$

therefore the user j derives $$A_iSA_j^t+tA_ie_j^t.$$

The difference between the results computed by the two users is:

$$E_i\times A_j^t-A_i\times E_j^t=A_iSA_j^t+te_iA_j^t-(A_iSA_j^t+tA_ie_j^t)$$

$$=te_iA_j^t-tA_ie_j^t.$$

This difference is small since t is small and $e_iA_j^t$ and $A_ie_j^t$ are small, which is due to the fact that $e_i$, $e_j$, $A_i$ and $A_j$ are all small. This allows us to get a common key for i and j by certain rounding techniques and therefore build a key distribution system.

Since the error terms for both matrices, $te_iA_j$ and $te_j^tA_i$, are small, the corresponding selected entries with tag 1 in $A_iSA_j$ (without the error terms) are essentially within the range of [(−(q−1)/4, (q−1)/4] or very close. Therefore the error terms will not push those selected terms in $A_iSA_j$ over either (−(q−1)/2 or (q−1)/2), that is when added the error terms, those selected entries will not need any further modular q operation but just add them as integers, since each element is represented as an integer in the range of [(−(q−1)/2(q−1)/2)]. The same argument goes with entries tagged by 0. These ensures that the process give a shared key between these two users.

From the way matrices $K_i$, $K_j$ are constructed, we know that each entry of $K_i$ and $K_j$ follows uniform distribution. Therefore we expect that each time the size of the first list selected by the user j from the matrix $K_j$ should be around $n^2$. Therefore this system can provide the shared secret with enough bits if we choose proper n.

Also we can build a version of this system with none symmetric matrices, in this case, the central serve needs to compute more matrices like $A_iS+e$ and $A_i^tS+e'$. Then it is possible, we can do the same kind of key distribution. This system again is less efficient.

On the other hand, since the RLWE problem can be viewed as a specialized commutative version of matrix-based LWE since an element in the ring can be view as a homomorphism on the ring. We can use the RLWE to build a key distribution in the same way.

Now let us look at why this key distribution is scalable. Clearly each user will have a pair A, and $E_i=A_iS+te_i$, and many users together can get many pairs, then to find the secret master key S is to solve the corresponding MLWE problem, except that, in this case, we impose the symmetric condition on the secret S. It is not difficult to argue again that this problem is as hard as a LWE problem, since given a LWE problem, we can convert it also into such a MLWE problem with symmetric secret matrix. Therefore, it is easy to see that this system is indeed scalable.

In terms of the provable security of the system, the situation is similar to the work done in the paper [DiLi]. We can give a provable security argument along the same line.

As we said before, since RLWE can be viewed as a special case MLWE, we will use the RLWE to build a very simple key distribution system.

We will choose the ring $R_q$ to be $F_q[x]/x^n+1$. To ensure the provable security, we need to choose parameter properly n, q, properly, for example $n=2^k$, q=1 mod(2n)[LPR]. For provable secure systems, we assume that we will follow the conventional assumptions on these parameters, and the assumption on the error distribution like $\chi$ in [LPR].

This construction is essentially based on the systems of above. We assume that we have a ring $R_q$ with a properly defined learning with error problem on the ring $R_q$ with error distribution X. The problem is defined as follows:

We are given a pair (A, E), where $$E=A\times S+te',$$

A, S where e' are elements in R, t is small integer, e' is an error element following the distribution of $\chi$, S is a fixed element and A is select randomly following uniform distribution, and the problem is to find the secret S.

With a central server, we can build a simple key distribution system as follows.

(1) The central server will also select a random element M in $R_q$ following uniform distribution.

(2) For each user, the central server will assign an public ID as $A_i$, where $A_i$ should be in the form of a chosen small element in $R_q$, namely following an error distribution like $\chi$.

(3) Each member is given a secret key by the central server:

$$S_i=MA_S+te_e,$$

where $e_i$ follows an error distribution $\chi$.

(4) If two user i and j wants to build a shared key, one user, say i can use the ID matrix of j, namely $A_i$, the its secret key to build a shared key with j by computing $$K_i=A_j\times S_i=A_jMA_i+tA_je_i,$$

and j can use its secret key to build a shared key with i by computing $$K_j=A_i\times S_j=A_jMA_i+tA_ie_j,$$

then derive the shared key with the rounding technique as follows:

(a) i will then make a list of size n, and this list consists of pairs in the form of (a, b), where a=0, . . . , n−1, and b=1 if the $x^a$ coefficient of $K_i$ is in the range of [−(q−1)/4, (q−1)/4], otherwise b=0.

(b) i will send this list to j. Then each will compute the residue of the corresponding entries modular t in the following way:

for an element of the list (a, b), 1) if b=1, each will compute the a-th entry of $K_i$ and $K_j$ modular t respectively;

2) if b=0, each will add (q−1)/2 to the a-th entry of $K_i$ and $K_j$ modular q back to range of [−(q−1)/4, (q−1)/4], then compute the residues modular t.

Since $A_i$ and $e_i$ are small elements in $R_q$, we have $A_i\times e_i$ is also small. This ensures that we indeed have a shared secret key. This, therefore, gives an key-distribution system.

Here we use very much the fact that in a RLWE problem that the multiplication is commutative. The key feature of our construction is that it is simple and straight forward. The provable security of the system is also straightforward.

1.4 the Construction of the New IBE Systems Based on Paring with Errors

We will first build a new public key encryption based on MLWE. To build an encryption system, we choose similar parameter $q\approx n^3$ or $n^4$ or similar polynomial functions of n, we choose again $\kappa_{n^2}$ to be an error distribution, for example the error distribution with each component are independent, and each component follow the same discrete distribution $\kappa_\sigma$ as in the case of LWE, namely a discrete normal distribution over $F_q$ center around 0 with standard deviation approximately $\sqrt{n}$. Surely we can also select high dimensional Gaussian distribution, which should be very convenient for the purpose to provable security. We select this simple distribution to simplify the argument concerning the validity of the encryption system. We can surely choose other parameters.

With such a setting, we can build an encryption system as in the case of the MLWE problem as follows:

(1) We select an n×n matrix S, whose entries are small following an error distribution $\kappa_{n^2}$, for example, each entries independently and randomly follows the distribution $\kappa_\sigma$.

(2) In the setting of the MLWE, we will derive one output pair (A, E), where $$E=A\times S+e,$$

or $$E=A\times S+te,$$

and t is small, t<<n, and they form the public key of our encryption system. Here e follow certain error distributions, for example the distribution we use above.

(3) S is the private key of the cryptosystem.

(4) A message in is represented as n×n matrix with binary entries of 0, 1 or n×n matrix with entries in the range modular t, namely 0, 1 . . . , t−1.

(5) A sender chooses a n×n small matrix B similar to S namely following an error distribution $\kappa_{n^2}$, for example, each entries independently and randomly follows the distribution $\kappa_\sigma$. Then the sender compute the encrypted message as:

$$(D_1,D_2)=(B\times A+e_1,B\times E+e_2+m\ (q/2)),$$

or $$((D_1,D_2)=(B\times A+te_1,B\times E+te_2+m,$$

where $e_1$ and $e_2$ are error matrices selected independently following some error distribution like e.

(6) To decrypt, the legitimate, in the first case, computes $$D_2-D_1\times S=(BE+e_2+m(q/2)-(BA+e_1)S)=eE+e_2-e_1S+m(q/2),$$

where everything is done in $F_q$, and we can check on each entry of the matrix, if it is near 0, we output 0, and if it is near (q−1)/2, we output 1, or we divide them by (q−1)/2 performed as a real number division and round them to 0 or 1 and the output will be the plaintext m; or in the second case, the legitimate user computes $$D_2-D_1\times S=(BE+te_2+m-(BA+te_1)S)=,teE+te_2-te_1S+m,$$

then modular t. This will be the plaintext m.

A, B, $e_i$ can follow different error distributions.

With large n, the output can give us the right plaintext with as high probability as demanded. The reason we could decrypt with high probability comes from the following.

$$D_2-D_1\times S=BE+e_2+m(q/2)-(BA+e)S$$

$$=B\times(A\times S+e)+e_2+m(q/2)-(BA+e_1)\times S$$

$$=B\times e+e_2-e_1\times S+m(q/2)$$

$B\times e+e_2-e_1\times S$ can be viewed as a error terms, which is determined by the distribution of the following random variable. With proper choice of parameters, like in the case of KE or KD systems, the decryption process will surely return the right answer when n is large enough. The same argument goes with the second case.

One key point of this new method is that on average, we can do the encryption much faster in terms of per bit speed because we can use fast matrix multiplication [CW] to speed up the computation process.

We note here that since matrix multiplication is not commutative, when we multiply two elements, the order is very important, unlike the case of the RLWE related systems.

We can also use the same idea in the ring LWE (RLWE) [LPR] to do encryption, where all the elements are in the ring $R_q$, and we have $$E=A\times S+te,$$

t is small positive integer and the entries of S is also small following error distribution $\kappa_{n^2}$. We encrypt a message as $$(D_1,D_2)=(BA+te_1,BE+te_2+m).$$

Then we decrypt by computing $$(BE+te_2+m-B(AS+te_1))(\text{mod } t).$$

This works because $$D_2-D_1\times S=BE+te_2+m-(BA+t_1e_1)S$$

$$=B\times(A\times S+te)+te_2+m-(BA+te_1)\times S$$

$$=tB\times e+te_2-te_1\times S+m$$

Since the error terms are small, by modular t, we certainly should get back the original plaintext.

For the MLWE problem, we surely need to choose the distribution accordingly when we need to obtain the provable security of the system.

There are several versions of identity-based encryption systems based on lattice related problems including the LWE problem [ABB], [ABVVW], [BKPW]. But they all look rather complicated. We can use the MLWE to build an identity-based encryption system.

With a central server, we can build a simple identity-based encryption system as follows.

(1) The central server will first select a secret n×n matrix S as the secret master key, where S is selected as a small element following certain error distribution $\kappa_{n^2}$ like error distributions like in KE and KD systems.

(2) The central server will also select a random element M following uniform distribution or similar distribution, but make sure that M has an inverse. If we could not find one first time, we will try again till we find one. We have a high probability of success to find such a M when q is large. Then the central serve will compute $$M_1=MS+te,$$

where e is small following certain error distribution $\kappa_{n^2}$.

(3) Then the central server will publicize M and $M_1$ as the master public key.

(4) For each user, the central server will assign an public ID as $A_i$, where $A_i$ is small following certain error distribution $\kappa_{n^2}$, and it can be generated from information that can identify the user.

(5) Each member is given a secret key:

$$S_i=SA_i+tM^{-1}e_i,$$

where $e_i$'s entries are small following the error distribution n. Surely this is the same as given $$MS_i=MSA_i+te_i,$$

since M is public.

(6) Anyone can use the ID, namely $A_i$, and the master public key to build a new public key for the user with ID $A_i$, which is given as the pair $(A_i, B_i)$, where $$A_i=M$$

and $$B_i=M_1A_i=MSA_i+teA_i,$$

and it is used as the public key to encrypt any message use the MLWE encryption system above.

This gives an identity based encryption system.

S, $A_i$, $e_i$, e can also follow different error distributions.

Since $A_i$ and e are small, we have $A_i$×e is also small. W also have that $$MS_i-B_i=MS_i-B_i$$

$$=M(SA_i+tM^{-1}e_i)-MSA_i+teA_i$$

$$=MSA_i+tMM^{-1}e_i)-MSA_i+teA_i$$

$$=te_i-teA_i,$$

Since e, $A_i$ and $e_i$ are small, $e-A_ie_i$ is also small and $te_i-tA_ie_i$ is also small. Therefore $S_i$ is a solution to a MLWE problem with the pair $(A_i, B_i)$ as the problem input. Therefore $S_i$ is indeed a secret key that could be used for decryption. Therefore the construction works. We need to choose parameters properly to ensure security.

The key feature of our construction is that it is simple and straight forward. The provable security of the system is also straightforward.

we can extend this construction using the RLWE problem. We will choose the ring R to be $F_q[x]/x^n+1$. To ensure the provable security, we need to choose parameter properly n, q, properly, namely $n=2^k$, $q=1 \bmod (2n)$[LPR]. But we can select other parameters for secure applications.

This construction is directly based on the encryption systems of the RLWE[LPR], namely, we assume that we have a ring R with a properly defined learning with error problem on the ring R. The problem is defined as follows: we are given a pair (A, E), where $$E=A\times S+te',$$

A, S where e' are elements in $R_q$, t is small integer, e' is an error element following an error distribution X, S is a fixed element and A is select randomly following uniform distribution, and the problem is to find the secret S. We also know that one can build a public key encryption systems using the RLWE problem[LPR], where A, and E serve as the public key, and the secret S, which needs to be small, serves as the private key. We can use the fact that in a ring-LWE problem that the multiplication is commutative.

With a central server, we can build a simple identity-based encryption system as follows.

(1) The central server will first select a secret S in R as the secret master key, where S is a selected small element follow certain error distributions $\chi$.

(2) The central server will also select a random element M in R following uniform distribution and make sure that M has an inverse. If we could not find one first time, we will try again till we find one. We have a high probability of success to find such a M when q is large. Then the central serve will computer $$M_1-MS-te,$$

where e is small and follows error distribution $\chi$.

(3) Then the central server will publicize M and $M_1$ as the master public key.

(4) For each user, the central server will assign an public ID as $A_i$, where A, is a small element in $R_q$, and it follows error distribution $\chi$.

(5) Each member is given a secret key:

$$S_i=SA_i+tM^{-1}e_i,$$

where $e_i$ small element in R, and it follow certain error distribution X. Surely this is the same as given $$MS_i=MSA_i+te_i,$$

since M is public.

(6) Anyone can use the ID, namely $A_i$, and the master public key to build a new public key for the user with ID $A_i$, which is given as the pair $(A_i, B_i)$, where $$A_i=M$$

and $$B_i=A_iM_1=A_iMS+tA_ie=MSA_i+tA_ie,$$

and it is used as the public key to encrypt any message. This gives an identity based encryption system.

The small elements like S, $A_i$, e, $e_i$ can follow different error distributions.

Since $A_i$ and e are small elements in R, we have $A_i \times e$ is also small. We have that $$S_iA_i - B_i = S_iM - B_i$$

$$= M(SA_i + iM^{-1}e_i) - MSA_i + A_ite$$

$$= MSA_i + tMM^{-1}e_i) - MSA_i + A_ite$$

$$= te - tA_ie_i,$$

which is due to the fact that this is a commutative ring. Since e, $A_i$ and $e_i$ are small, $e - A_ie_i$ is also small and $te - tA_ie_i$ is also small. Therefore $S_i$ is a solution to a ring LWE problem with the pair $(A_i, B_i)$ as the problem input. Therefore $S_i$ is indeed a secret key that could be used for decryption.

We can build easily a hierarchical IBE system using similar procedure, where each user can server as a central server.

The key feature of our construction is that it is simple, straight forward and efficient. The provable security of the system is also straightforward.

In the all the systems above using pairing with errors over the ring, one may use polynomials in the form of $$f(x) = \Pi f_i(x) + g(x),$$

where each $f_i$, g(x) is a extremely sparse matrix with very few terms, for example, 2 or 3 terms none-zero. Using this kind of polynomial can speed up the encryption and decryption computations.

LITERATURE CITED

[ABB] S. Agrawal, D. Boneh, X. Boyen: Efficient Lattice (H)IBE in the Standard Model. In proceedings of Eurocrypt 2010, Lecture Notes in Computer Science, Volume 6110, pp. 553-572, 2010.

[ABVVW] S. Agrawal, X. Boyen, V. Vaikuntanathan, P. Voulgaris, H. Wee: Fuzzy Identity Based Encryption from Lattices. IACR Cryptology ePrint Archive 2011: 414 (2011)

[ACPS] B. Applebaum, D. Cash, C. Peikert, A. Sahai; Fast Cryptographic Primitives and Circular-Secure Encryption Based on Hard Learning Problems. Advances in Cryptology-CRYPTO 2009, Lecture Notes in Computer Science, Volume 5677 pp 595-618, 2009

[BKPW] M. Bellare, E. Kiltz, C. Peikert, B. Waters: Identity-Based (Lossy) Trapdoor Functions and Applications. In Proceedings of EUROCRYPT 2012, Lecture Notes in Computer Science, Volume 7237, pp 228-245 2012.

[BSHKVY] C. Blundo, A. De Santis, A. Herzberg, S. Kutten, U. Vaccaro, M. Yung: Perfectly-Secure Key Distribution for Dynamic Conferences. in Advances in Cryptology Crypto 92, Lecture Notes in Computer Science, Volume 740, pp 471-486, 1993

[BKW] A. Blum, A. Kalai, and H. Wasserman. Noise-tolerant learning, the parity problem, and the statistical query model. Journal of the ACM, 50(4), pp 506-19, 2003.

[COP] D. Coppersmith, Shmuel Winograd, Matrix multiplication via arithmetic progressions, Journal of Symbolic Computation—Special issue on computational algebraic complexity archive 9 (3), pp 251-280, 1990

[DiHe] W. Diffie, M. Hellman, New directions in cryptography, IEEE Transactions on Information Theory 22 (6), pp 644-54, 1976.

[DiLi] J. Ding, X. Lin, A Simple Provably Secure Key Exchange Scheme Based on the Learning with Errors Problem, Cryptology ePrint Archive, Report 688, 2012

[LNV] K. Lauter, M. Naehrig, V. Vaikuntanathan, Can Homomorphic Encryption be Practical?, Cryptology ePrint Archive, Report 2011/405, 2011, http://eprint.iacr.org,

[LPR] V. Lyubashevsky, C. Peikert, O. Regev, On ideal lattices and learning with errors over rings In Eurocrypt 2010

[REG] O. Regev, On lattices, learning with errors, random linear codes, and cryptography, in Proceedings of the 37th Annual ACM Symposium on Theory of Computing STOC05, ACM, pp 84-93, 2005

[SHA] A. Shamir, Identity-based cryptosystems and signature schemes, in Advances in CryptologyCrypto '84, Lecture Notes in Computer Science, Vol. 196, Springer-Verlag, pp. 47-53, 1984

[SHO] P. Shor, Polynomial-time algorithms for prime factorization and discrete logarithms on a quantum computer, SIAM Journal of Computing 26, pp. 1484-1509, 1997.

[STR] V. Strassen, Gaussian Elimination is not Optimal, Numer. Math. 13, p. 354-356, 1969

The invention claimed is:

[1. Method for establishing a key exchange over an open channel between a first party A and a second party B, comprising:

(1) openly selecting, by Party A and Party B together, parameters, n, q and small whole number t, (t<<n), where q is an odd prime, and an error distribution $\kappa_{n^2}$ to be a distribution over n×n matrix over $F_q$, a n×n matrix M over $F_q$ uniformly and randomly, where q is of size of a polynomial of n like $n^3$, and elements of $F_q$ are represented by integers in the range [−(q−1)/2, (q−1)/2)];

(2) choosing, by each of the parties privately, its own secret matrix $S_i$ (i=A, B) a n×n matrix chosen according to the error distribution $\kappa_{n^2}$, and error matrix $e_i$, (i=A, B) as a n×n matrix following the error distribution $\kappa_{n^2}$; computing by a processor of the Party A $$M_A = MS_A + te_A,$$

where t is a small integer (t<<n);
computing by the Party B $$M_B = M^tS_B + te_B,$$

(3) Both of the parties exchange $M_i$ in the open communication channel;

(4) computing by the Party A:

$$K_A = S^t_A \times M_B = S^t_A M^t S_B + tS^t_A e_B;$$

computing by the Party B:

$$K_B = M^t_A \times S_B = S^t_A M^t S_B + te^t_A S_B;$$

(5) performing by both the Party A and the Party B a rounding technique to derive the shared key, comprising:

(a) making by the Party B a list $T_1$ of all positions of the entries of $K_B$ such that these entries are in the range of [−(q−1)/4, (q−1)/4] and a list $T_2$ of all positions which are not in the range of [−(q−1)/4, (q−1)/4], then sending by the Party B to the Party A the list $T_1$, (b) computing by each of the parties privately the residues of these entries modular t in $T_1$, and for the entries not in $T_1$, which is in $T_2$, adding (q−1)/2 to each entry and computing the residue modular q first (into the range of [−(q−1)/4, (q−1)/4]) then the residue modular t, which gives a shared key between the two parties.]

[2. The method according to claim 1, wherein q is a polynomial function of degree 2 or higher, or a similar function, and $\kappa_{n^2}$ is the a distribution that each component are independent and each component follow certain error distribution like the discrete error distribution $\kappa_\sigma$, namely a discrete normal distribution over $F_q$ center around 0 with standard deviation approximately $\sqrt{n}$, or a similar distribution.]

[3. The method according to claim 1, wherein the matrices is rectangular as long as the matrix multiplication is compatible and the parameters are adjusted accordingly.]

[4. The method according to claim 1, wherein the matrices are replaced with elements of the ring $R_q=F_q[x]/f(x)$ with $f(x)=x^n+1$ and the parameters is adjusted accordingly.]

[5. The method according to claim 1, wherein the rounding technique is replaced with a similar technique.]

[6. The method according to claim 1, wherein the matrices are replaced with elements of the ring $R_q=F_q[x]/f(x)$ with $f(x)=x_n+1$, the parameters is adjusted accordingly, and the polynomial elements used are selected in the form of $f(x)=\Pi f_i(x)+g(x)$, where each $f_i$, $g(x)$ is a sparse matrix with very few terms terms none-zero.]

[7. Method, for a central server, building a key distribution (KD) system, comprising:

(1) selecting, by the central server, parameters select parameters, n, q and small whole number t, ($t<<n$), where q is an odd prime, q is of size of a polynomial of n like $n^3$ and elements of $F_q$ are represented by integers in the range $[-(q-1)/2, (q-1)/2)]$, an error distribution $\kappa_{n^2}$ a distribution over n×n matrix over $F_q$; and selecting by the central server a symmetric randomly chosen n×n matrix S over $F_q$ as a master key;

(2) giving, by the central server, to each user index as i, a general matrix $A_i$ as an ID with small entries following error distribution $\kappa_{n^2}$, where the ID matrix of each user is public and the central server have also a choice to generate the ID with information that can identify the user;

(3) distributing, by the central server, for each user securely a secret:

$$E_i=A_iS+te_i,$$

where $e_i$ is a matrix selected following error distribution $\kappa_{n^2}$ and this is kept private for each user;

obtaining a secret key shared between the User i and the User j comprising:

computing by a process of the User i:

$$K_i=E_i\times A_j^t=A_iSA_j^t+te_iA_j^t;$$

and computing by a processor of the User j $$K_j=A_i\times(E_j)^t=A_iS^tA_j^t+tA_ie_j^t=A_iSA_j^t+tA_ie_j^t;$$

then the two users deriving a shared key between the two users using the following simple rounding method, comprising:

when the User j wants to establish a shared key with the user i, collecting by the user j all the entries (including their positions in the matrix) in $K_j$ that are in the range of $(-(q-1)/4, (q-1)/4)$, namely those entries which are closer to 0 than $(q-1)/2$; sending by the User j to the user i a list of the positions of the entries in the matrix (only the position not the values of the entries themselves) that are randomly selected from the collection, which is tagged by 0, and a list of entries not in the list tagged by 0; then selecting by the user i the same entries in its own matrix $E_i\times A_j$, which gives them a shared list of common entry positions, therefore the corresponding entries of the matrix; then computing by each of the users the residue of the entries modular t lagged by 1 and compute the residue of the sum of each of the entries tagged by 0 with $(q-1)/2$, which build a new identical ordered list of values, their shared secret key.]

[8. The method according to claim 7, wherein q is a polynomial function of degree 2 or higher, or a similar function, $\kappa_{n^2}$ is the a distribution that each component are independent and each component follow certain error distribution like the discrete error distribution $\kappa_\sigma$, namely a discrete normal distribution over $F_q$ center around 0 with standard deviation approximately $\sqrt{n}$ or a similar distribution.]

[9. The method according to claim 7, wherein the matrices are replaced with elements of the ring $R_q=F_q[x]/f(x)$ with $f(x)=x^n+1$ and the parameters is adjusted accordingly.]

[10. The method according to claim 7, wherein the procedure for two users i and j to derive a shared key is modified such that the roles of i and j and exchanged.]

[11. The method according to claim 7, wherein several central servers to work together to build a distributed KD system.]

[12. The method according to claim 7, wherein the matrices are replaced with elements of the ring $R_q=F_q[x]/f(x)$ with $f(x)=x_n+1$, the parameters is adjusted accordingly, and the polynomial elements used are selected in the form of $f(x)=\Pi f_i(x)+g(x)$, where each $f_i$, $g(x)$ is a sparse matrix with very few terms terms none-zero.]

[13. Method, for a central, building an identity-based encryption system, comprising:

(1) selecting by the central server parameters, n, q and small whole number t, ($t<<n$), where q is an odd prime, q is of size of a polynomial of n like $n^3$ and elements of $F_q$ are represented by integers in the range $[-(q-1)/2, (q-1)/2)]$, and an error distribution $\kappa_{n^2}$ to be a distribution over n×n matrix over $F_q$; and selecting by the central server a secret n×n matrix S as the secret master key, where S is selected as a small element following certain error distribution $\kappa_{n^2}$;

(2) selecting by the central server a random element M following uniform distribution, but making sure that M has an inverse: when the central server could not find one first time, it tries again till it finds one; then computing by the central server $$M_1=MS+te,$$

where e is small following certain error distribution $\kappa_{n^2}$;

(3) then publicizing by the central server M and $M_1$ as the master public key;

(4) assigning by the central server for each user indexed by i an public ID as $A_i$, where $A_i$ is small following certain error distribution $\kappa_{n^2}$, and the central server has can generate $A_i$ from information that can identify the user i;

(5) processing by a processor and giving by the central server for each user, namely, the User i, a secret key:

$$S_i=SA_i+tM^{-1}e_i,$$

where $e_i$'s entries are small following the error distribution κ;

(6) then establishing by anyone using the ID, $A_i$, and the master public key, a new public key for the user with ID $A_i$, which is given as the pair $(A_i, B_i)$, where $$A_i=M$$

and $$B_i=M_1A_i=MSA_i+teA_i,$$

and using by anyone as the public key to encrypt any message use the MLWE encryption system.]

[14. The method according to claim 13, wherein q is a polynomial function of degree 2 or higher, or a similar function, $\kappa_{n^2}$ is the a distribution that each component are independent and each component follow certain error distribution like the discrete error distribution $\kappa_o$, namely a discrete normal distribution over $F_q$ center around 0 with standard deviation approximately $\sqrt{n}$ or a similar distribution.]

[15. The method according to claim 7, wherein the matrices is rectangular as long as the matrix multiplication is compatible and the parameters are adjusted accordingly.]

[16. The method according to claim 13, wherein the matrices are replaced with elements of the ring $R_q=F_q[x]/f(x)$ with $f(x)=x^n+1$ and the parameters is adjusted accordingly.]

[17. The method according to claim 13, wherein several central servers to work together to build a distributed IBE system.]

[18. The method according to claim 13, wherein the procedure is extended further to build a hierarchical IBE system, where each user servers as a lower level central server.]

[19. The method according to claim 13, wherein the matrices are replaced with elements of the ring $R_q=F_q[x]/f(x)$ with $f(x)=x_n+1$, the parameters is adjusted accordingly, and the polynomial elements used are selected in the form of $f(x)=\Pi f_i(x)+g(x)$, where each $f_i$, $g(x)$ is a sparse matrix with very few terms terms none-zero.]

*20. A method of deriving a shared key between a first networked computer and a second networked computer over an open communication channel, the method comprising:*

*receiving, from a key distribution system, an exchange matrix Ei of a matrix size n rows by the matrix size n columns, wherein the key distribution system has selected:*

*a finite field F comprising a first prime number q of elements, such that entries of Ei are in F; and*

*a whole number t, wherein the whole number t is less than the matrix size n;*

*determining a key matrix Ki resulting from multiplying the exchange matrix Ei and a transpose of a respective public ID matrix of the second networked computer; and*

*applying a rounding method to each entry of the key matrix Ki to generate the shared key.*

*21. The method of claim 20, wherein the rounding method comprises:*

*determining an interval matrix according to values of the entries of the key matrix Ki by:*

*determining a plurality of numbered intervals of elements of the finite field F;*

*determining, for each entry of the key matrix Ki, a numbered interval of the plurality of numbered intervals the value of the entry belongs to; and*

*assigning, for each entry of the key matrix Ki, each respective determined numbered interval to an entry of the interval matrix corresponding to the entry of the key matrix Ki; and*

*sending, to the another networked computer, the interval matrix; and*

*applying each entry in the interval matrix to round each corresponding entry of the key matrix Ki to generate the shared key.*

*22. The method of claim 20, wherein the rounding method comprises:*

*determining a plurality of numbered intervals of elements of the finite field F;*

*receiving an interval matrix from the another networked computer; and*

*applying each entry in the interval matrix to round each corresponding entry of the key matrix Ki to generate the shared key.*

*23. The method of claim 20, wherein the rounding method comprises:*

*determining an interval matrix according to values of the entries of the key matrix Ki by:*

*determining a plurality of numbered intervals of elements of the finite field F;*

*determining, for each entry of the key matrix Ki, a numbered interval of the plurality of numbered intervals the value of the entry of the key matrix Ki belongs to; and*

*assigning, for each entry of the key matrix Ki, each respective determined numbered interval to an entry of the interval matrix corresponding to the entry of the key matrix Ki; and*

*for the entry of the key matrix Ki, if an interval value in the corresponding entry of the interval matrix does not correspond to a first numbered interval of the plurality of numbered intervals:*

*adding, to the value of the entry in the key matrix Ki, a fixed value V of elements of a numbered interval, of the plurality of numbered intervals, corresponding to the interval value to form a sum;*

*determining a first residue of the sum modulo the first prime number q; and*

*determining a second residue of the first residue modulo the whole number t;*

*for the entry of the key matrix Ki, if the corresponding value in the interval matrix does correspond to the first number of the interval numbers:*

*determining a second residue of the first residue modulo the whole number t.*

*24. The method of claim 23, wherein each numbered interval assigned to the interval matrix comprises a value of zero or one.*

*25. The method of claim 23, wherein the first numbered interval comprises an interval of approximately half of the elements of the finite field F.*

*26. The method of claim 23, wherein the first numbered interval comprises elements comprising values in the range [−(the first prime number q−1)/4, (the first prime number q−1)/4].*

*27. The method of claim 23, wherein the fixed value V comprises (the first prime number q−1)/2.*

*28. The method of claim 20, wherein the rounding method comprises:*

*determining a plurality of numbered intervals of elements of the finite field F;*

*receiving an interval matrix from the networked computer;*

*for the entry of the key matrix Ki, if an interval value in the corresponding entry of the interval matrix does not correspond to a first numbered interval of the plurality of numbered intervals:*

*adding, to the value of the entry in the key matrix Ki, a fixed value V of elements of a numbered interval, of the plurality of numbered intervals, corresponding to the interval value to form a sum;*

*determining a first residue of the sum modulo the first prime number q; and*

*determining a second residue of the first residue modulo the whole number t;*

*for the entry of the key matrix Ki, if the corresponding value in the interval matrix does correspond to the first number of the interval numbers:*

*determining a second residue of the first residue modulo the whole number t.*

*29. The method of claim 28, wherein each numbered interval assigned to the interval matrix comprises a value of zero or one.*

*30. The method of claim 28, wherein the first numbered interval comprises an interval of approximately half of the elements of the finite field F.*

*31. The method of claim 28, wherein the first numbered interval comprises elements comprising values in the range [−(the first prime number q−1)/4, (the first prime number q−1)/4].*

*32. The method of claim 28, wherein the fixed value V comprises (the first prime number q−1)/2.*

*33. A method of deriving a shared key for a networked computer with another networked computer, the method comprising:*

*receiving, from a key distribution system, an exchange matrix Ej of a matrix size n rows by the matrix size n columns, wherein the key distribution system has selected:*

*a finite field F comprising a first prime number q of elements, such that entries of Ej are in F; and*

*a whole number t, wherein the whole number t is less than the matrix size n;*

*determining a key matrix Kj resulting from multiplying a public ID matrix of the another networked computer and a transpose of the exchange matrix Ej; and*

*applying a rounding method to each entry of the key matrix Kj to generate the shared key.*

*34. The method of claim 33, wherein the rounding method comprises:*

*determining an interval matrix according to values of the entries of the key matrix Kj by:*

*determining a plurality of numbered intervals of elements of the finite field F;*

*determining, for each entry of the key matrix Kj, a numbered interval of the plurality of numbered intervals the value of the entry belongs to; and*

*assigning, for each entry of the key matrix Kj, each respective determined numbered interval to an entry of the interval matrix corresponding to the entry of the key matrix Kj; and*

*sending, to the another networked computer, the interval matrix; and*

*applying each entry in the interval matrix to round each corresponding entry of the key matrix Kj to generate the shared key.*

*35. The method of claim 33, wherein the rounding method comprises:*

*determining a plurality of numbered intervals of elements of the finite field F;*

*receiving an interval matrix from the another networked computer; and*

*applying each entry in the interval matrix to round each corresponding entry of the key matrix Kj to generate the shared key.*

*36. The method of claim 33, wherein the rounding method comprises:*

*determining an interval matrix according to values of the entries of the key matrix Kj by:*

*determining a plurality of numbered intervals of elements of the finite field F;*

*determining, for each entry of the key matrix Kj, a numbered interval of the plurality of numbered intervals the value of the entry of the key matrix Kj belongs to; and*

*assigning, for each entry of the key matrix Kj, each respective determined numbered interval to an entry of the interval matrix corresponding to the entry of the key matrix Kj; and*

*for the entry of the key matrix Kj, if an interval value in the corresponding entry of the interval matrix does not correspond to a first numbered interval of the plurality of numbered intervals:*

*adding, to the value of the entry in the key matrix Kj, a fixed value V of elements of a numbered interval, of the plurality of numbered intervals, corresponding to the interval value to form a sum;*

*determining a first residue of the sum modulo the first prime number q; and*

*determining a second residue of the first residue modulo the whole number t;*

*for the entry of the key matrix Kj, if the corresponding value in the interval matrix does correspond to the first number of the interval numbers:*

*determining a second residue of the first residue modulo the whole number t.*

*37. The method of claim 36, wherein each numbered interval assigned to the interval matrix comprises a value of zero or one.*

*38. The method of claim 36, wherein the first numbered interval comprises an interval of approximately half of the elements of the finite field F.*

*39. The method of claim 36, wherein the first numbered interval comprises elements comprising values in the range [−(the first prime number q−1)/4, (the first prime number q−1)/4].*

*40. The method of claim 36, wherein the fixed value V comprises (the first prime number q−1)/2.*

*41. The method of claim 33, wherein the rounding method comprises:*

*determining a plurality of numbered intervals of elements of the finite field F;*

*receiving an interval matrix from the networked computer;*

*for the entry of the key matrix Kj, if an interval value in the corresponding entry of the interval matrix does not correspond to a first numbered interval of the plurality of numbered intervals:*

*adding, to the value of the entry in the key matrix Kj, a fixed value V of elements of a numbered interval, of the plurality of numbered intervals, corresponding to the interval value to form a sum;*

*determining a first residue of the sum modulo the first prime number q; and*

*determining a second residue of the first residue modulo the whole number t;*

*for the entry of the key matrix Kj, if the corresponding value in the interval matrix does correspond to the first number of the interval numbers:*

*determining a second residue of the first residue modulo the whole number t.*

*42. The method of claim 41, wherein each numbered interval assigned to the interval matrix comprises a value of zero or one.*

*43. The method of claim 41, wherein the first numbered interval comprises an interval of approximately half of the elements of the finite field F.*

44. The method of claim 41, wherein the first numbered interval comprises elements comprising values in the range [−(the first prime number q−1)/4, (the first prime number q−1)/4].

45. The method of claim 41, wherein the fixed value V comprises (the first prime number q−1)/2.

46. An encryption key authority system comprising:

a central server in communication with a plurality of users, the central server comprising at least one processor; and a non-transitory computer-readable storage medium in operable communication with the processor, wherein the computer-readable storage medium comprising computer-executable instructions that, when executed, cause the at least one processor to:

select a matrix size n and a finite field F comprising a first prime number q of elements, and an error distribution K over the finite field F, wherein the first prime number q comprises a value approximately equal to a polynomial of the matrix size;

generating a master key matrix S comprising values of random elements of the finite field F chosen according to the selected error distribution K, wherein the master key matrix S is a matrix and wherein a size of the master key matrix S comprises the matrix size n rows by the matrix size n columns;

select a whole number t, wherein the whole number t is less than the matrix size n;

select a first random matrix M comprising values of random elements of the finite field F chosen according to a uniform distribution, wherein the first random matrix M is selected such that an inverse of the first random matrix M exists;

select a master error matrix e comprising values of elements in the finite field F chosen according to the selected error distribution K, wherein a size of the master error matrix e comprises the matrix size n rows by the matrix size n columns;

generate a product matrix resulting from multiplying the first random matrix M and the master key matrix S;

generate a scalar error matrix resulting from multiplying the whole number t and the master error matrix e;

generate a master public key pair comprising the first random matrix M and a second random matrix M1 resulting from adding the scalar error matrix to the respective product matrix;

generate a first respective ID matrix Ai for each of a plurality of users, wherein each first respective ID matrix Ai comprises values of elements in the finite field F chosen according to the selected error distribution K, wherein a size of the first respective ID matrix Ai comprises the matrix size n rows by the matrix size n columns;

determine a respective secret key matrix Si for each of the plurality of users based on the master public key pair and the first respective ID matrix Ai for each of the plurality of users; and send, to each of the plurality of users, the respective secret key matrix Si.

47. The system of claim 46, wherein the at least one processor are distributed throughout a network.

48. The system of claim 46, wherein a user of the plurality of users acts as an encryption key authority for a hierarchical child key distribution system.

49. The system of claim 46, wherein each matrix comprises an element of a ring of the form $R_q=F_q[x]/f(x)$, wherein $f(x)=x^n+1$.

50. The system of claim 49, wherein polynomial elements are selected in the form of $[\Pi f_i(x)]+g(x)$, wherein $g(x)$ and each $f_i(x)$ comprise a sparse polynomial with few non-zero terms.

51. The system of claim 46, wherein the first prime number q is a polynomial function of degree two or higher of the matrix size n, and wherein the error distribution K is a distribution such that each matrix entry is independent and each matrix entry follows a discrete normal distribution over the finite field F, centered around zero, with a standard deviation of approximately a square root of the matrix size n.

52. The system of claim 46, wherein the respective secret key matrix Si for each of the plurality of users is determined by:

determining a respective product matrix resulting from multiplying the master key matrix S and the first respective ID matrix Ai;

selecting a respective error matrix ei comprising values of elements in the finite field F chosen according to the selected error distribution K, wherein a size of the respective error matrix ei comprises the matrix size n rows by the matrix size n columns;

determining a respective scalar matrix resulting from multiplying the whole number t and the inverse of the random matrix M times the respective error matrix ei; and adding the respective scalar error matrix to the respective product matrix.

53. A method of a networked computer encrypting a message between a first networked computer and a second networked computer, the method comprising:

determining, at the first networked computer, a public matrix pair comprising a first matrix M and a second matrix M1;

receiving, at the first networked computer, an ID matrix Ai of the second networked computer;

determining a key matrix pair for the second networked computer, wherein the key matrix pair comprises the first matrix M and a second public matrix Bi, wherein the second public matrix Bi comprises a matrix resulting from multiplying the second matrix M1 and the ID matrix Ai; and applying the key matrix pair to encrypt the message to the second networked computer; and sending the encrypted message to the second networked computer.

* * * * *